Nov. 14, 1944.　　A. L. ROMANOFF　　2,362,774
EGG SORTING METHOD AND MECHANISM
Filed July 9, 1943　　2 Sheets-Sheet 1

INVENTOR
ALEXIS L. ROMANOFF.
BY
ATTORNEY

Nov. 14, 1944.  A. L. ROMANOFF  2,362,774
EGG SORTING METHOD AND MECHANISM
Filed July 9, 1943   2 Sheets-Sheet 2
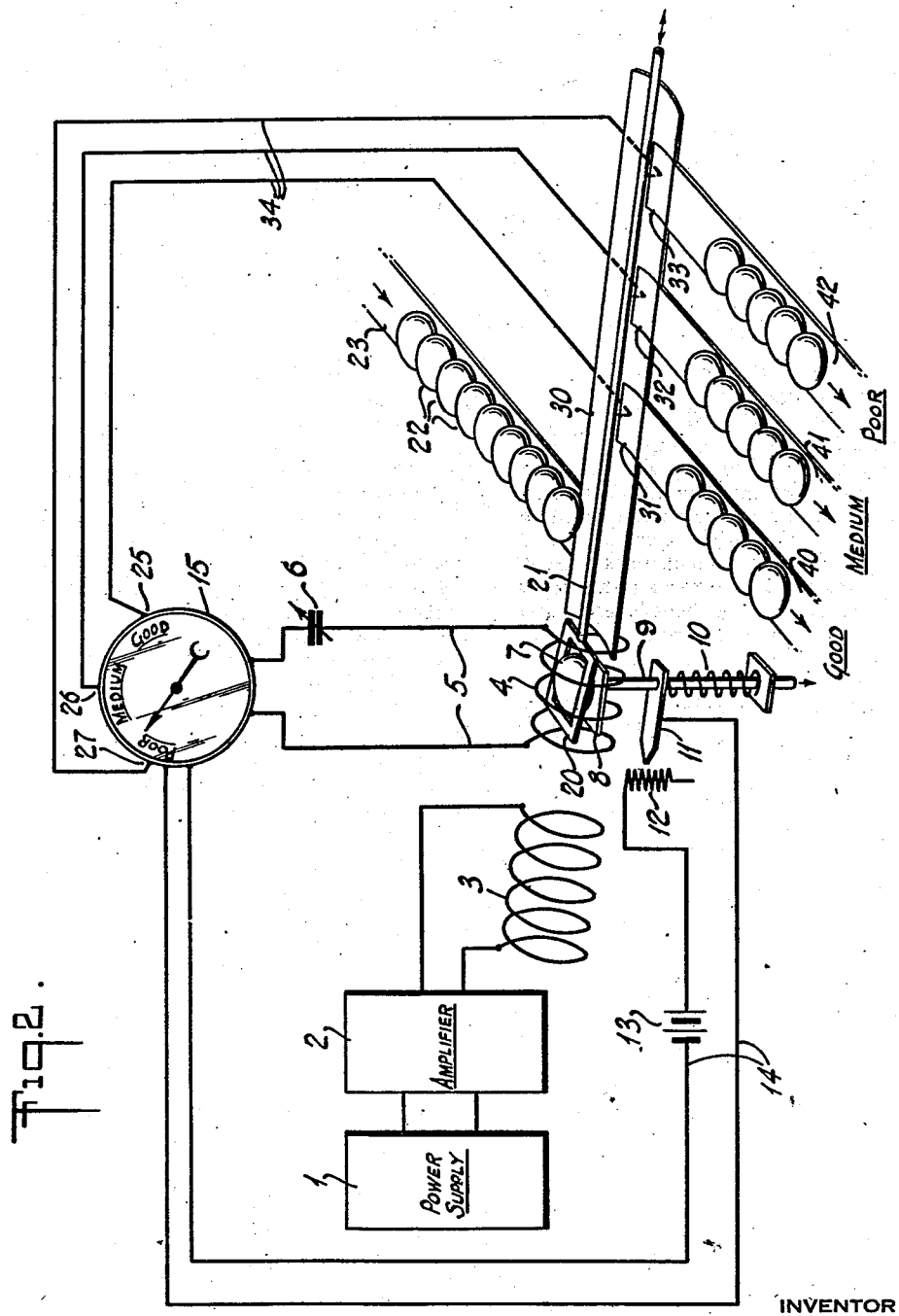
INVENTOR
ALEXIS L. ROMANOFF
BY
ATTORNEY Patented Nov. 14, 1944

2,362,774

UNITED STATES PATENT OFFICE 2,362,774

EGG SORTING METHOD AND MECHANISM

Alexis L. Romanoff, Ithaca, N. Y., assignor to Cornell Research Foundation, Inc., Ithaca, N. Y., a corporation of New York Application July 9, 1943, Serial No. 494,065

3 Claims. (Cl. 209—81)

This invention relates to the testing and sorting of eggs preparatory to being placed in cold storage or sold; and it is directed toward minimizing the losses incident to such storage. Several billion eggs are stored annually, and experience has shown that when they are sorted by the ordinary methods such as candling, some of the eggs deteriorate much more rapidly than others. A method of preliminary examination which would select the eggs having the best keeping qualities before going to the expense of storing them would result in considerable savings. I have developed certain methods of testing by which the probable future rate of deterioration can be rapidly determined without damaging the eggs, together with a mechanical sorting mechanism capable of handling the large quantities of eggs necessarily involved. The apparatus is also applicable to the grading of eggs on the basis of their nutritional qualities, whether used for storage or for immediate sale. By grading eggs according to their nutritional value as well as freshness the farmer can be stimulated to produce better eggs for the better market thus opened.

The general object of the invention is to provide an improved method and apparatus for sorting and testing eggs along the lines above indicated, and in connection therewith other specific objects relating to the methods and the mechanisms employed will become apparent as the description proceeds.

Referring now to the drawings forming part of this specification,

Fig. 2 illustrates schematically an egg sorting mechanism by which certain principles involved in the radio frequency field analysis above mentioned are applied to eggs in quantity to obtain the desired objects.

Figure 1:
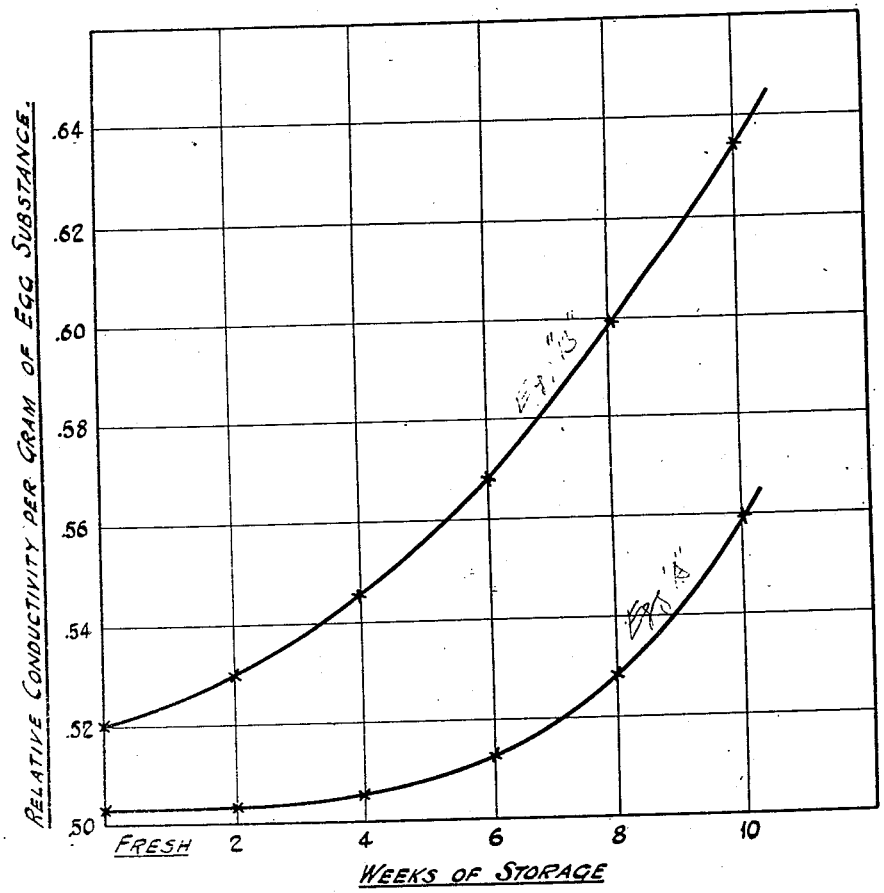
Fig. 1 illustrates typical experimental data as obtained by a radio frequency field applied to two eggs which deteriorate at different rates.

Referring now to Fig. 1, which is typical of the data obtained from a large number of experiments on eggs, the ordinates in that diagram represent reading obtained by placing the egg in a magnetic field of radio frequency and measuring the resulting reduction in current, indicative of the conductivity of the egg. Readings with an egg which deteriorated slowly were taken at weekly intervals over a period of ten weeks, as shown by the lower curve; and similar readings with an egg which deteriorated more rapidly were indicated by the upper curve. Two eggs which at the start candle the same may later behave quite differently; and this can be ascertained at an early stage by my new method. The significant fact is that the curves do not cross nor meet, so that even at the very early stages the egg that will deteriorate most rapidly in the future is distinguishable from the egg that will later exhibit the best qualities for storage. Thus those that will keep well in cold storage can be segregated from those that will not. Similar curves distinguish the eggs on the basis of nutritive value. The application of this discovery to the selection among large quantities of fresh eggs of those most suitable for storage is illustrated in the mechanism shown in Fig. 2.

Referring now to Fig. 2, the power supply 1 thru the amplifier 2 supplies alternating current of radio frequency to the coil 3 which is inductively coupled to the egg testing coil 4. This coil 4 is part of a resonant circuit 5 of radio frequency which may be adjusted or tuned by the variable condenser 6. The coil 4 is arranged to surround the egg 7 and the parts associated therewith. A pair of condenser plates may be used in place of the coil 4, being considered an equivalent device in this type of work. In order to simultaneously weigh the egg 7 a small platform 8 is provided, together with any suitable mechanism for electrically determining the weight. This is schematically shown as a plunger 9 attached to the platform 8 and supported by a calibrated spring 10. The plunger 9 carries a movable contact 11 which connects with a variable resistance 12 so that the current from the battery 13 in the circuit 14 is varied according to the weight of the egg 7.

The indicator 15 is of the compound or double coil type so that its reading is controlled by both the current in the circuit 14 according to weight and also by the current in the circuit 5 according to the internal character of the egg as reflected in its radio frequency conductivity as well as the dielectric effect. In both cases the extent of reduction of current as applied to the indicator 15 depends on the electrical conductivity of the egg in regard to the high frequency eddy currents induced therein, this indication being corrected according to the weight of the egg by the current in the circuit 14 as described. An indicator of the thermoammeter type has been found to be satisfactory, though any compound type may be used.

The egg 7 is moved into and out of the testing coil 4 by any suitable mechanism, illustrated by way of example by the cage 20 operated by the reciprocating rod 21. The incoming eggs 22 come in thru the feeder 23 and are picked up one by one by the cage 20 and moved into the testing coil 4, from which an indication of their internal condition is obtained by the indicator 15 as described, which may for example be divided into three grades, say good, medium and poor, corresponding to the electrical connections 25, 26 and 27 respectively. The channel 30 in which the eggs are moved by the reciprocation of the cage 20 and rod 21 is provided with three electrical trips or trap doors 31, 32 and 33, which are connected by the wires 34 to the three electrical connections 25, 26 and 27 respectively. The trap 31 is operated by the "Good" indication, the trap 32 is operated by the "Medium" indication, and the trap 33 by the "Poor" indication. The eggs thus graded according to their predicted keeping qualities are segregated in the three outgoing feeder lines 40, 41 and 42, marked "Good," "Medium" and "Poor" respectively.

Various forms of egg grading or sorting mechanisms may be used, the important feature being that the eggs are sorted according to their qualities of internal conductivity so related to the facts of probable future deterioration determined by the curves of Fig. 1 as to predict which eggs will keep best in storage and segregate them from the rest. This permits a great saving in storage costs. While I have in the foregoing described certain specific forms by way of example, it will be understood that they are merely for purposes of illustration to make clear the principles of the invention, which is not limited to the particular form shown, but is susceptible to various modifications and adaptations in different installations as will be apparent to those skilled in the art without departing from the scope of the invention as stated in the following claims.

I claim:

1. The method of sorting eggs in accordance with their probable future rate of deterioration under storage conditions which consists in weighing each egg and placing the egg in an alternating electromagnetic field of radio frequency, registering the induced reaction per unit of weight on the energizing radio frequency system, and sorting the eggs according to said reaction while still in a fresh condition prior to storage, on the prediction that those of lesser reaction will deteriorate more slowly in storage.

2. In a mechanism for sorting eggs according to their suitability for storage, the combination of means for producing a high frequency electromagnetic field, an egg feeding mechanism for successively placing eggs in said field, a weighing mechanism for said eggs, a meter responsive to both the electrical reaction of the field and to the weight of the egg, and electrically controlled channels operated by the meter, whereby the eggs are sorted according to their electrical reaction per unit of substance, those of lower reaction being passed to storage as having a lesser predicted rate of deterioration.

3. In a mechanism for sorting eggs according to their suitability for storage, the combination of a source of alternating current of radio frequency, a testing coil energized by said current, a feeding mechanism for successively placing eggs in said coil, a weighing mechanism for said eggs, a meter responsive to the reaction of the electrical currents induced in the egg, said meter being simultaneously corrected by the weighing mechanism according to the mass of the egg, and trips in said feeding mechanism operated by said meter to separate the eggs according to their relative conductivity, those of lower conductivity being deemed more suitable for storage as having a lower predicted rate of deterioration.

ALEXIS L. ROMANOFF.